(12) United States Patent
Nakae

(10) Patent No.: US 8,583,095 B2
(45) Date of Patent: Nov. 12, 2013

(54) MOBILE TERMINAL DEVICE

(75) Inventor: Kazuaki Nakae, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/391,903

(22) PCT Filed: Aug. 23, 2010

(86) PCT No.: PCT/JP2010/064205
§ 371 (c)(1),
(2), (4) Date: Feb. 23, 2012

(87) PCT Pub. No.: WO2011/024768
PCT Pub. Date: Mar. 3, 2011

(65) Prior Publication Data
US 2012/0149439 A1    Jun. 14, 2012

(30) Foreign Application Priority Data
Aug. 27, 2009    (JP) .................................. 2009-197198

(51) Int. Cl.
*H04M 3/42* (2006.01)

(52) U.S. Cl.
USPC ........ 455/415; 455/412.2; 455/566; 455/567; 455/575.3; 455/575.4

(58) Field of Classification Search
USPC ............... 455/410–414.1, 415, 466, 566–567
See application file for complete search history.

(56) References Cited

U.S. PATENT DOCUMENTS

| | | | |
|---|---|---|---|
| 5,907,604 A * | 5/1999 | Hsu | 379/142.06 |
| 2002/0154744 A1* | 10/2002 | Mori | 379/67.1 |
| 2004/0203505 A1* | 10/2004 | Newman et al. | 455/90.3 |
| 2005/0090290 A1* | 4/2005 | Hama et al. | 455/566 |
| 2006/0097927 A1* | 5/2006 | Satoh et al. | 343/702 |
| 2006/0135197 A1* | 6/2006 | Jin et al. | 455/550.1 |
| 2006/0229118 A1* | 10/2006 | Kaneko | 455/575.3 |
| 2007/0211884 A1 | 9/2007 | Ishii et al. | |
| 2009/0098856 A1* | 4/2009 | Hsu | 455/410 |

FOREIGN PATENT DOCUMENTS

| | | |
|---|---|---|
| EP | 2071858 A1 | 6/2009 |
| JP | 2001-136247 A | 5/2001 |
| JP | 2005-184539 A | 7/2005 |
| JP | 2006-128783 A | 5/2006 |

(Continued)

OTHER PUBLICATIONS

International Search Report and Written Opinion dated Sep. 21, 2010, issued for International Application No. PCT/JP2010/064205.

(Continued)

*Primary Examiner* — Dai A Phuong
(74) *Attorney, Agent, or Firm* — Procopio, Cory, Hargreaves & Savitch LLP

(57) ABSTRACT

A mobile telephone includes a display, a memory which stores at least an originator name associated with a telephone number or a mail address as originator information, and a display controller which controls display in notifying the arrival of an incoming telephone call or incoming electronic mail. It is determined whether the mobile telephone is moved in a preset pattern based on output from an acceleration sensor in notifying the arrival of an incoming call. In the case where the mobile telephone is moved in the preset pattern, the display controller causes the display to display an originator name from originator information.

10 Claims, 9 Drawing Sheets

(56) References Cited

FOREIGN PATENT DOCUMENTS

| JP | 2007-243678 A | 9/2007 |
|---|---|---|
| JP | 2008-085456 A | 4/2008 |
| JP | 2008-124876 A | 5/2008 |
| JP | 2009-124368 A | 6/2009 |
| JP | 2009-159542 A | 7/2009 |

OTHER PUBLICATIONS

Office Action dated Aug. 27, 2013, issued in counterpart Japanese Application No. 2009-197198.

* cited by examiner

TELEPHONE BOOK TABLE

| REGISTRATION NUMBER | NAME | TELEPHONE NUMBER | MAIL ADDRESS | GROUP |
|---|---|---|---|---|
| 001 | xxxxxxxxxx | xxxxxxxxxx | xxxxxxxxxxxx | xxx |
| 002 | xxxxxxxxxx | xxxxxxxxxx | xxxxxxxxxxxx | xxx |
| .... | .... | .... | .... | .... |
| 999 | xxxxxxxxx | xxxxxxx | xxxxxxxxxx | xxx |

FIG. 3

MOBILE TERMINAL DEVICE

TECHNICAL FIELD

The present invention relates to a mobile terminal device such as a mobile telephone and a PDA (Personal Digital Assistant).

BACKGROUND ART

A mobile telephone is installed with a function of a telephone book (an address book). The function of such a telephone book is that telephone book information registered in advance by a user is read out of a memory based on a manipulation such as search by the user and information is displayed on a display screen. Here, the telephone book information is formed of an originator telephone number, a mail address, a name (a name and a title), an address, and so on.

In such a mobile telephone, such a configuration may be possible in which when an incoming telephone call or incoming electronic mail arrives, a ring tone is made and an originator's name is displayed on a display screen if the telephone number or mail address of the originator is registered in a telephone book (for example, Patent Document 1).

However, in the case of providing the configuration as described above, others might see personal information such as an originator's name displayed on the display screen against the user's will. It can also be considered that such a mode is provided in which an originator's name is not displayed on the display screen in notifying the arrival of an incoming call. However, when this mode is set, the user him/herself cannot confirm an originator's name, causing a decrease in convenience.

The present invention has been made in view of such problems. It is an object to provide a mobile terminal device that can prevent personal information from being seen by others and cause a user him/herself to readily confirm an originator in notifying the arrival of an incoming call.

SOLUTION TO PROBLEM

A mobile terminal device of the present invention includes: a display section; a display controller which controls the display section; a storage section which stores at least information based on a name or title indicating an originator associated with a telephone number or mail address as originator information; and a detector which detects whether a predetermined trigger action is made to the mobile terminal device. Here, the display controller causes the display section to display the information based on a name or title from the originator information, based on a detection of the trigger action by the detector when arrival of an incoming telephone call or incoming electronic mail is notified.

In accordance with the mobile terminal device of the present invention, information based on a name or title is not displayed in notifying the arrival of an incoming call, if a predetermined trigger action is not detected. Thus, such an event does not tend to occur that information based on a name or title is seen by others against the user's will. Moreover, information based on a name or title is displayed if a predetermined trigger action is detected. Thus, it is possible that a user him/herself readily confirm an originator by making a trigger action.

It is noted that the term "information based on a name or title" includes a name or tile itself and also widely includes those identifying an originator by naming such as by a family name or a first name from family and first names, by a family name or a first name with a title of respect, or by the abbreviated name of a name or a title, by a nickname, or by a pet name.

A mobile terminal device of the present invention includes: an acceleration sensor; a pattern register in which acceleration information when the mobile terminal device is moved in a predetermined pattern is registered; and a controller which performs control related to notification of arrival of an incoming call based on matching between information detected at the acceleration sensor when arrival of an incoming telephone call or incoming electronic mail is notified and the acceleration information.

BRIEF DESCRIPTION OF DRAWINGS

FIG. 3 is a diagram illustrating a telephone book table in accordance with an embodiment.

Figure 1:
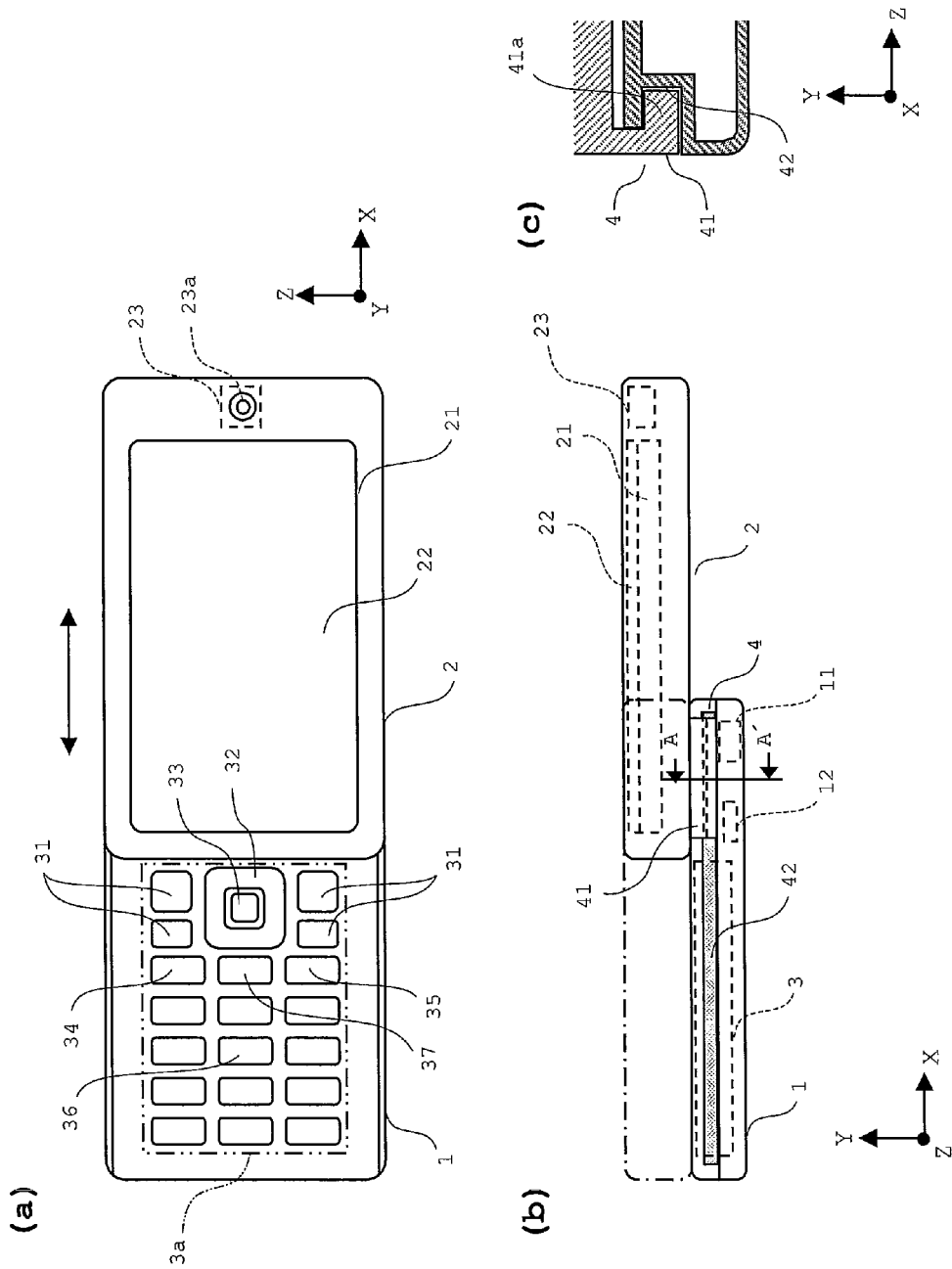
FIGS. 1(a) to 1(c) are diagrams illustrating the appearance configuration of a mobile telephone in accordance with an embodiment.

However, the drawings are intended for explanation only, which will not limit the claims of the present invention.

DESCRIPTION OF EMBODIMENT

In the following, an embodiment of the present invention will be described with reference to the drawings.

It is noted that in this embodiment, an acceleration sensor 12 corresponds to a "detector", a "manipulation detector", and a "move detector" described in the claims. A display 21 corresponds to a "display section" described in the claims. An in camera 23 corresponds to a "detector" and an "imager" described in the claims. A touch sensor 22 corresponds to a "detector" and a "manipulation detector" described in the claims. A display controller 101 corresponds to a "display controller" described in the claims. A pattern extractor 102 corresponds to a "detector" described in the claims. Matching determiners 103 and 114 correspond to a "detector" described in the claims. Display permitters 104 and 115 correspond to a "detector" and a "move detector" described in the claims. A face extractor 111 corresponds to a "detector" described in the claims. A face parameter extractor 112 corresponds to a "detector" described in the claims. A registration controller 113 corresponds to a "detector" described in the claims. A pattern register 202 corresponds to a "detector" described in the claims. A face register 211 corresponds to a "detector"

described in the claims. A key input circuit 305 corresponds to a "detector" and a "manipulation detector" described in the claims. It is noted that the correspondence between the claims and this embodiment is merely an example, which will not limit the claims to this embodiment.

FIGS. 1(a) to 1(c) are diagrams illustrating the appearance configuration of a mobile telephone. FIG. 1(a) is a front view illustrating the mobile telephone in a state in which a second cabinet is opened, and FIG. 1(b) is a side view illustrating the same state. FIG. 1(c) is a cross sectional view taken on a line A-A' in FIG. 1(b).

The mobile telephone includes a first cabinet 1 and a second cabinet 2. The first cabinet 1 is provided with a key inputter 3. The key inputter 3 detects various input manipulations to the mobile telephone.

A manipulation key group 3a constituting the key inputter 3 is arranged on the top surface of the first cabinet 1. The manipulation key group 3a includes four startup keys 31, a direction key 32, an enter key 33, a call key 34, a call end key 35, 12 ten keys 36, and a clear key 37.

The startup keys 31 are mainly manipulated in starting a specific application such as an electronic mail function, a telephone book function, and a Web function. The direction key 32 is mainly manipulated in selecting a desired menu from various menus displayed on a display screen. The enter key 33 is mainly manipulated in determining the selected menu. The call key 34 is mainly manipulated in starting a call, and the call end key 35 is mainly manipulated in ending the call. The ten keys 36 are mainly manipulated in making input of characters (hiragana and katakana characters and alphabets), numerical characters, and signs. The clear key 37 is mainly manipulated in erasing inputted characters or the like. It is noted that such a configuration may be possible in which a part of the functions of the ten keys 36 is implemented by a QWERTY key or the like.

An out camera 11 is arranged in the first cabinet 1. The out camera 11 is a camera module with a few million pixels, for example. A lens window (not shown) of the out camera 11 is exposed in the back surface of the first cabinet 1, and a subject image is captured in the out camera 11 through this lens window.

Moreover, an acceleration sensor 12 is arranged in the first cabinet 1. The acceleration sensor 12 is a three axis acceleration sensor, and arranged to detect acceleration occurring in three directions, an X-axis direction, a Y-axis direction, and a Z-axis direction in the diagrams.

A display 21 is arranged in the second cabinet 2. The display 21 is formed of a liquid crystal panel 21a and a panel backlight 21b that lights the liquid crystal panel 21a, as described later. It is noted that the display 21 may be formed of other display devices such as an organic electroluminescent device.

A touch sensor 22 is arranged on the display screen side of the display 21. The touch sensor 22 has a transparent sheet shape, and the display screen of the display 21 can be seen through the touch sensor 22.

The touch sensor 22 includes a first transparent electrode and a second transparent electrode arranged in a matrix. The touch sensor 22 detects a position on the display screen, at which a user touches, by detecting a change in an electrostatic capacitance between the transparent electrodes, and outputs a position signal corresponding to the position. It is noted that the touch sensor 22 may be a touch sensor such as a resistance film touch sensor and a pressure-sensitive touch sensor, not limited to an electrostatic capacitance touch sensor.

An in camera 23 is arranged in the second cabinet 2. The in camera 23 is a camera module with pixels lower than the pixels of the out camera 11, for example a few hundred thousand pixels. A lens window 23a of the in camera 23 is exposed in the front surface of the second cabinet 2, and a subject image is captured in the in camera 23 through this lens window.

The out camera 11 is used for general photo shooting in a camera mode. On the other hand, the in camera 23 is mainly used for shooting the image of the user (a caller) in making conversations on a visual telephone.

The second cabinet 2 is slidably joined to the first cabinet 1 by a slide mechanism 4 in the X-axis direction shown in FIGS. 1(a) to 1(c). As shown in FIG. 1(c), the slide mechanism 4 is formed of a guide plate 41 and a guide groove 42. The guide plate 41 is provided on right and left both ends on the back surface of the second cabinet 2, and has a projection 41a on the lower end thereof. The guide groove 42 is formed on the side surface of the first cabinet 1 along the sliding direction (in the X-axis direction shown in FIGS. 1(a) to 1(c)). The projection 41a of the guide plate 41 is engaged with a guide groove 42.

In a state in which the mobile telephone is closed, the second cabinet 2 is almost completely laid on the first cabinet 1 as indicated by an alternate long and short dash line in FIG. 1(b). In this state (in the closed state), such a state is provided in which all keys of the manipulation key group 3a are hidden behind the rear of the second cabinet 2. The second cabinet 2 can slide (in the opened state) until the guide plate 41 reaches the terminal end position of the guide groove 42. When the second cabinet 2 is completely opened, all keys of the manipulation key group 3a are exposed outwardly as shown in FIG. 1(a).

In the state in which all keys are hidden, input manipulations can be made to the mobile telephone through the touch sensor 22. In making the input manipulations, the image of a soft key is displayed at a predetermined position on the display screen of the display 21.

It is noted that it is also possible to provide a manipulation key different from the manipulation key group 3a at a position externally manipulatable even though the second cabinet 2 is completely closed, such as on the side surface of the first cabinet 1, for example. With the provision of the different manipulation key, such a manipulation key is used to make a desired manipulation even though the second cabinet 2 is completely closed.

Figure 2:
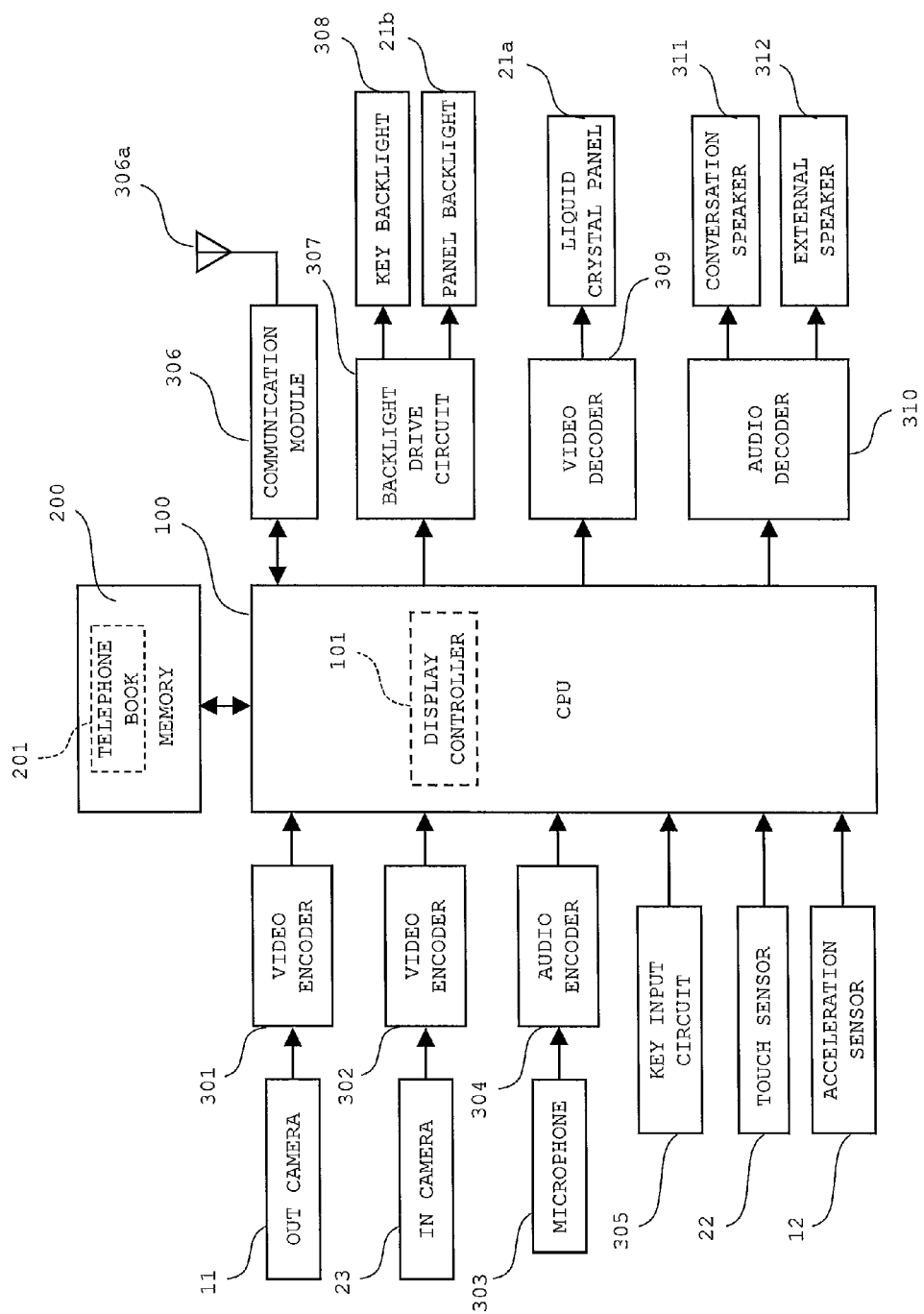
FIG. 2 is a block diagram illustrating the overall configuration of the mobile telephone in accordance with an embodiment.

FIG. 2 is a block diagram illustrating the overall configuration of the mobile telephone. The mobile telephone in this embodiment includes a CPU 100, a memory 200, video encoders 301 and 302, a microphone 303, an audio encoder 304, a key input circuit 305, a communication module 306, a backlight drive circuit 307, a key backlight 308, a video decoder 309, an audio decoder 310, a conversation speaker 311, and an external speaker 312, in addition to the components described above.

The out camera 11 has an imaging device such as a CCD. The out camera 11 digitizes an imaging signal outputted from the imaging device, applies various corrections such as gamma correction to the imaging signal, and outputs the imaging signal to the video encoder 301. The video encoder 301 applies an encoding process to the imaging signal from the out camera 11, and outputs the imaging signal to the CPU 100.

The in camera 23 has an imaging device such as a CCD. The in camera 23 digitizes an imaging signal outputted from the imaging device, applies various corrections such as gamma correction to the imaging signal, and outputs the imaging signal to the video encoder 302. The video encoder 302 applies an encoding process to the imaging signal from the in camera 23, and outputs the imaging signal to the CPU 100.

The microphone 303 converts a collected sound into an audio signal, and outputs the audio signal to the audio encoder 304. The audio encoder 304 converts the analog audio signal from the microphone 303 into a digital audio signal, applies an encoding process to the digital audio signal, and outputs the digital audio signal to the CPU 100.

When the keys of the manipulation key group 3a are manipulated, the key input circuit 305 outputs input signals corresponding to the individual keys to the CPU 100.

The communication module 306 converts an audio signal, an image signal, a text signal, or the like from the CPU 100 into a radio signal, and sends the radio signal to a base station through an antenna 306a. Moreover, the communication module 306 converts a radio signal received through the antenna 306a into an audio signal, an image signal, a text signal, or the like, and outputs these signals to the CPU 100.

The backlight drive circuit 307 supplies a voltage signal corresponding to a control signal from the CPU 100 to the key backlight 308 and the panel backlight 21b. The key backlight 308 is lit by the voltage signal from the backlight drive circuit 307, and illuminates the individual keys of the manipulation key group 3a. The panel backlight 21b is lit by the voltage signal from the backlight drive circuit 307, and illuminates the liquid crystal panel 21a.

The video decoder 309 converts a video signal from the CPU 100 into an analog or digital video signal that can be displayed on the liquid crystal panel 21a, and outputs the video signal to the liquid crystal panel 21a. The liquid crystal panel 21a displays an image corresponding to the video signal on the display screen.

The audio decoder 310 applies a decoding process to an audio signal from the CPU 100, converts the audio signal into an analog audio signal, and outputs the analog audio signal to the conversation speaker 311. Furthermore, the audio decoder 310 applies a decoding process to a sound signal of various signaling sounds such as a ring tone and an alarm sound from the CPU 100, converts the sound signal into an analog sound signal, and outputs the analog sound signal to the external speaker 312. The conversation speaker 311 reproduces the audio signal from the audio decoder 310 as audio. The external speaker 312 reproduces the ring tone or the like from the audio decoder 310.

The memory 200 includes a ROM and a RAM. The memory 200 stores a control program to provide a control function for the CPU 100. Furthermore, the memory 200 saves image data imaged by the out camera 11 and image data, text data (mail data), or the like externally captured through the communication module 306 in a predetermined file format.

Moreover, the memory 200 stores a telephone book table 201. As shown in FIG. 3, the telephone book table 201 is registered with telephone book information such as an originator name (a name, a title, a pet name, a nickname, or the like), a telephone number, a mail address, and a group name to which the originator belongs. Titles such as "company", "friend", and "family" are prepared for group names. For example, if an originator is a person working at the same company to which a user belongs, the title "company" is registered in the column of a group name. The items of the telephone book information are associated with three-digit registration numbers.

The CPU 100 operates the out camera 11, the in camera 23, the microphone 303, the communication module 306, the liquid crystal panel 21a, the conversation speaker 311, the external speaker 312, and the like depending on the control program based on input manipulation signals from the key input circuit 305 and the touch sensor 22. Thus, the CPU 100 executes various functions (applications) such as a call function and an electronic mail function.

The CPU 100 includes a display controller 101. The display controller 101 is implemented as a software function executed by the CPU 100. When an incoming telephone call or incoming electronic mail arrives, the display controller 101 displays an originator's name on the display 21 as originator information in notifying the arrival of an incoming call. Such display is performed when display permission provided for the display controller 101 by the user to perform authentication.

Figure 4:
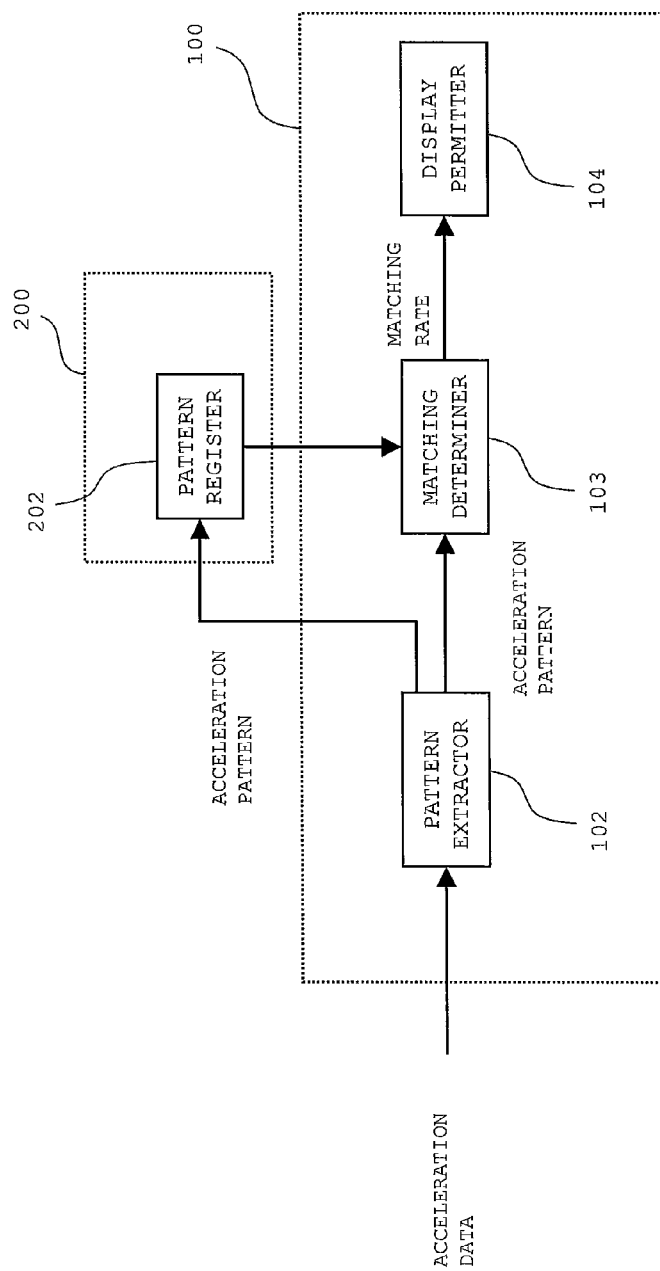
FIG. 4 is a function block diagram for a determination process for display permission in accordance with an embodiment.

FIG. 4 shows a functional block provided for a determination process for display permission.

The CPU 100 includes a pattern extractor 102, a matching determiner 103, and a display permitter 104. The memory 200 includes a pattern register 202. The pattern extractor 102, the matching determiner 103, and the display permitter 104 are implemented as software functions executed by the CPU 100. Moreover, a storage area, which is a part of the memory 200, is allocated to the pattern register 202.

Acceleration data is inputted from the acceleration sensor 12 to the pattern extractor 102. When the user makes a manipulation to move the mobile telephone in a specific pattern, the pattern extractor 102 extracts a pattern of a change in acceleration data in this manipulation. For example, in the case where the user draws a figure such as a star or quadrilateral in air with the mobile telephone in the hand, the pattern extractor 102 extracts a pattern of a change in acceleration data (in the following, referred to as an "acceleration pattern") from the start to end of drawing the figure by the user. The pattern extractor 102 then outputs the extracted acceleration pattern to the pattern register 202, if the mode is a registration mode to resister authentication data in advance. On the other hand, the pattern extractor 102 outputs the extracted acceleration pattern to the matching determiner 103, if it is time when the arrival of an incoming telephone call or incoming electronic mail is notified.

The pattern register 202 stores the acceleration pattern sent from the pattern extractor 102 as authentication data.

The matching determiner 103 checks the acceleration pattern sent from the pattern extractor 102 against the acceleration pattern registered in the pattern register 202, and calculates a matching rate (a relevance factor) between both acceleration patterns. The matching determiner 103 then outputs the calculated matching rate to the display permitter 104.

The display permitter 104 determines whether to permit display by comparing the matching rate sent from the matching determiner 103 with a preset threshold.

Figure 5:
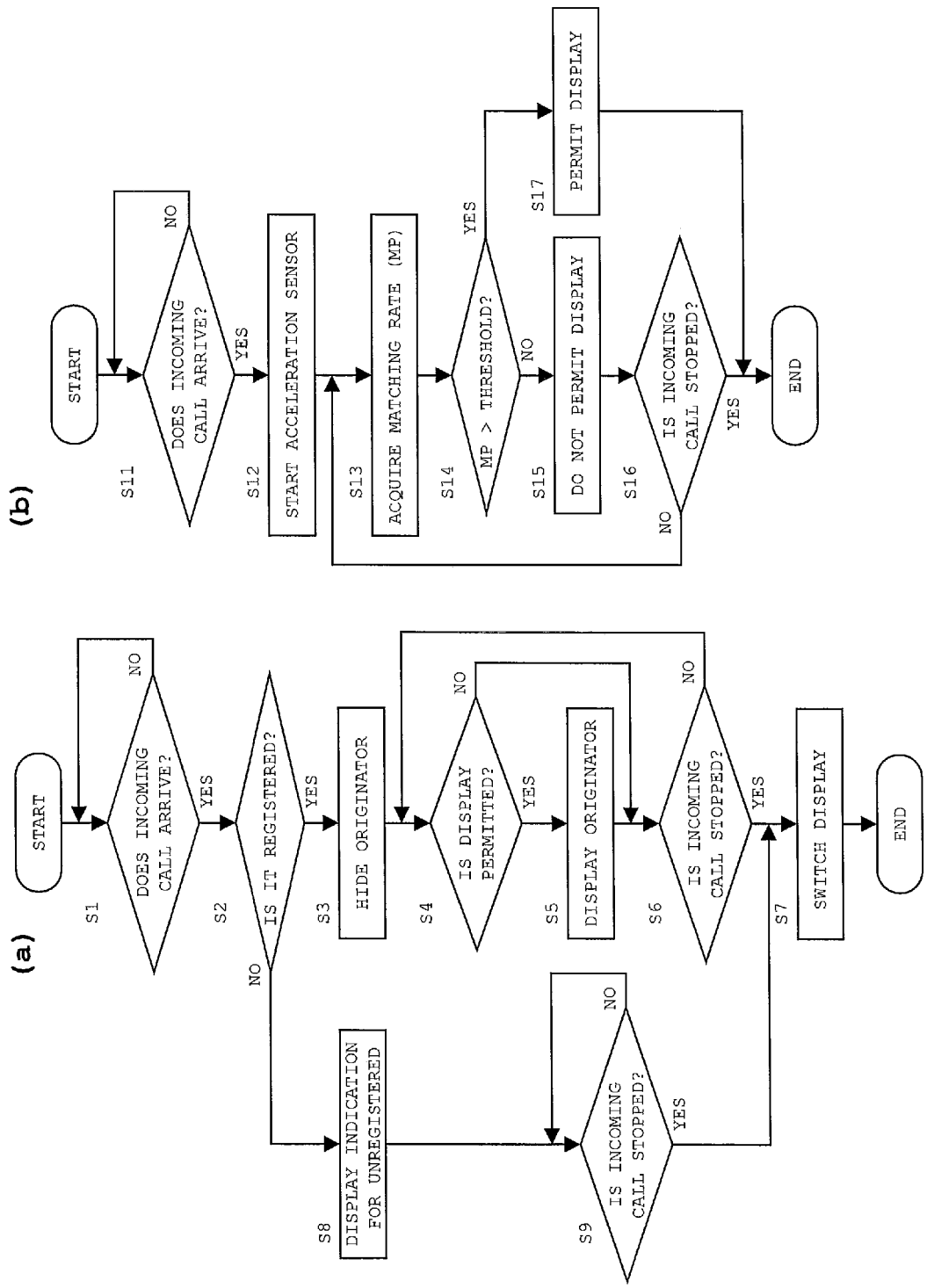
FIGS. 5(a) and 5(b) are flow charts illustrating a display control process and a determination process for display permission in accordance with an embodiment.
Figure 6:
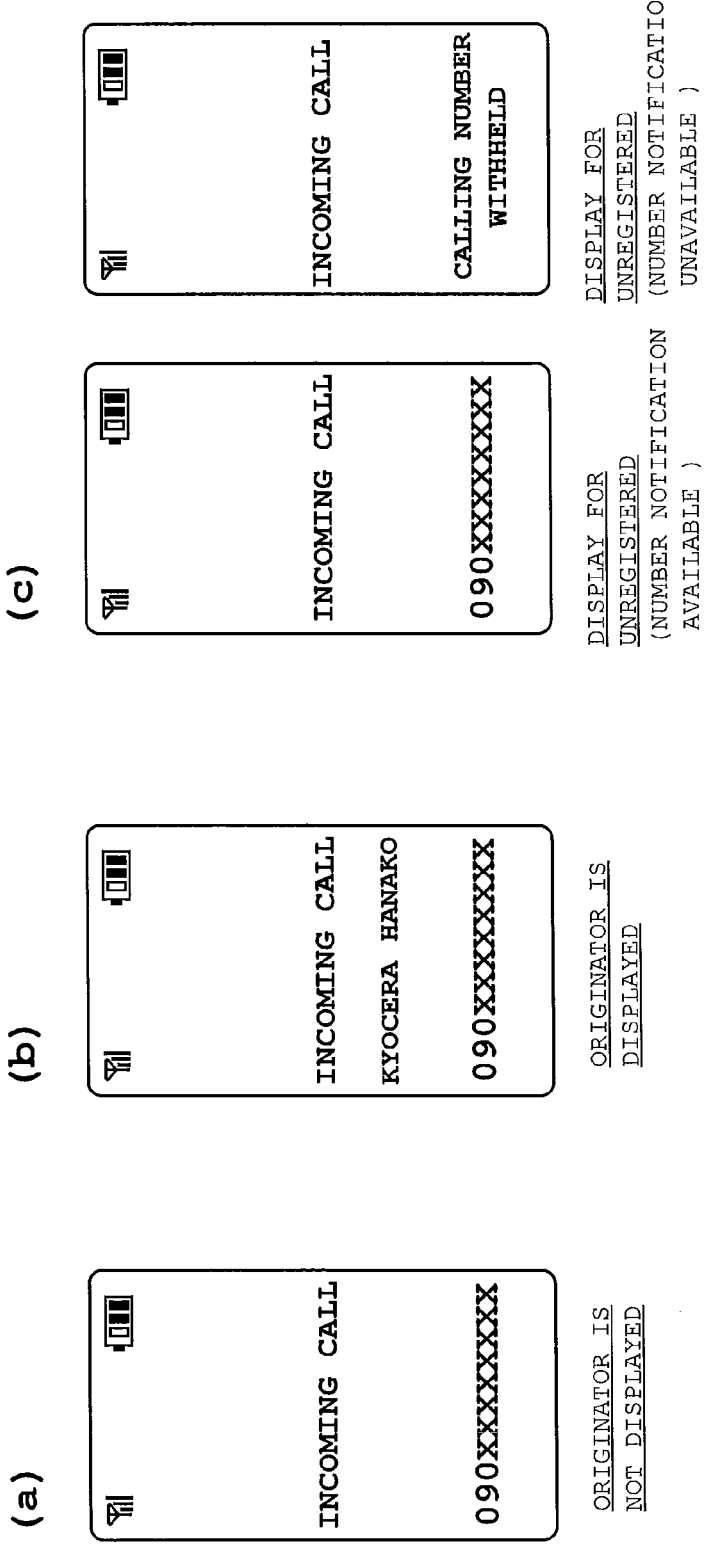
FIGS. 6(a) to 6(c) are diagrams illustrating a display screen in notifying of the arrival of an incoming call in accordance with an embodiment.

Next, a display control process executed by the display controller 101 when the arrival of an incoming call is notified will be described in detail. FIG. 5(a) shows a flow chart illustrating the display control process. FIGS. 6(a) to 6(c) show an exemplary screen display on the display 21 based on the display control process.

When an incoming telephone call or incoming electronic mail arrives, the arrival of an incoming call is notified by the external speaker 312 through an alarm sound or music.

When an incoming telephone call (incoming electronic mail) arrives (S1:YES), the display controller 101 determines whether the received telephone number (a mail address in the case of electronic mail) is registered in the telephone book table 201 (S2).

If the telephone number (the mail address) is registered in the telephone book table 201 (S2:YES), the display controller 101 causes the display 21 to display the fact that an incoming call is arriving and the received telephone number (the mail address) (S3: see FIG. 6(a)). In this display, an originator's name is not displayed on the display 21.

Subsequently, the display controller 101 determines whether the display permitter 104 permits display. If display is not permitted (S4: NO), the display controller 101 provides a state in which the originator's name is not displayed on the display 21. Thus, the originator's name will not be seen by others even though the mobile telephone is placed at a location apart from the user.

Display permission is outputted from the display permitter 104 based on a user's authentication manipulation, described later. When the user notices the notification of the arrival of an incoming call, the user performs an authentication manipulation to the mobile telephone.

If display is permitted (S4: YES), the display controller 101 reads an originator's name corresponding to the telephone number (the mail address) out of the telephone book table 201. The display controller 101 then causes the display 21 to display the read name together with display of the fact that an incoming call is arriving and the received telephone number (the mail address) (S5: see FIG. 6(b)). Thus, the user can confirm who is the originator.

In the case of a telephone call, the user presses the call key 34 to provide a call state, and the incoming call operation is stopped. In the case of electronic mail, the reception of mail is completed to end the incoming mail operation. With the end of the incoming mail operation, the notification of the arrival of incoming mail is also stopped.

When the display controller 101 determines that the incoming call operation is stopped (S6: YES), the display controller 101 switches display to screen display corresponding to the telephone or electronic mail (S7), and ends the process.

It is noted that in the case of a telephone call (electronic mail) from an originator who is not registered in the telephone book table 201, the display controller 101 determines that the originator is not registered in the telephone book table 201 in Step S2. In this case, the display controller 101 causes the display 21 to display display information corresponding to the case of no registration. For example, as shown in FIG. 6(c), if the telephone number (the mail address) is notified, the fact that an incoming call is arriving and the received telephone number (the mail address) are displayed on the display 21. If the telephone number (the mail address) is not notified, the fact that an incoming call is arriving and a calling number is withheld, or notification is not allowed is displayed on the display 21. As described above, if the incoming call operation is stopped (S9: YES), the display controller 101 switches display to screen display corresponding to the telephone or electronic mail (S7), and ends the process.

Next, the determination process for display permission executed by the display permitter 104 will be described in detail. FIG. 5(b) is a flow chart illustrating the determination process for display permission.

When an incoming telephone call (incoming electronic mail) arrives (S11: YES), the display permitter 104 starts the acceleration sensor 12 (S12). When a manipulation is made to move the mobile telephone, a matching rate is outputted from the matching determiner 103 as described above.

When the display permitter 104 acquires the matching rate (S13), the display permitter 104 compares the acquired matching rate with a predetermined threshold (S14). In this comparison, if the matching rate does not exceed the threshold (S14: NO), the display permitter 104 does not provide display permission for the display controller 101 because others might move the mobile telephone (S15).

On the other hand, if the matching rate exceeds the threshold (S14: YES), the display permitter 104 provides display permission for the display controller 101 because it can be considered that the user him/herself makes an authentication manipulation (S17).

As described above, after providing display permission for the display controller 101, the display permitter 104 ends the process. Moreover, the display permitter 104 also ends the process when the incoming call operation is ended with no display permission (S16: YES).

As described above, in this embodiment, in notifying the arrival of an incoming telephone call or incoming electronic mail, the originator's name is not displayed on the display 21 if authentication is not provided by the user. Thus, it is possible to prevent an originator's name from being seen by others even though an incoming call arrives in a state in which the mobile telephone is placed at a location apart from the user. In addition to this, it is possible to readily confirm the originator's name by the user him/herself to make an authentication manipulation.

Particularly, in this embodiment, authentication is necessary, so that it is possible to further prevent an originator's name from being seen by others with no easy display permission.

Modification Example 1

In the aforementioned embodiment, such a configuration is provided in which authentication is performed based on a manipulation to move the mobile telephone for display permission. However, it is also possible to use another configuration for the configuration for providing authentication. For example, as in this modification, it is possible to provide a configuration in which a user face image captured by the in camera 23 is used to perform authentication.

Figure 7:
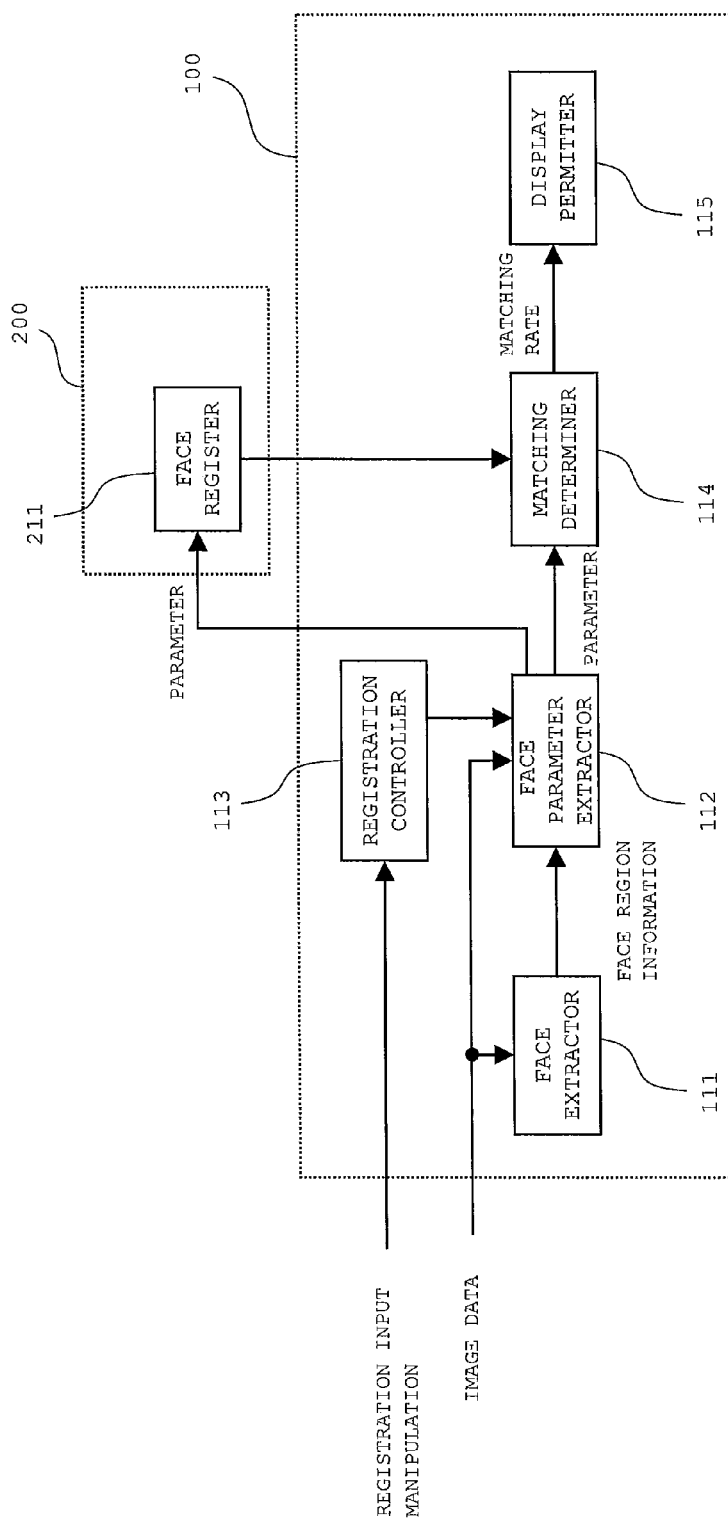
FIG. 7 is a function block diagram for a determination process for display permission in accordance with modification example 1.

FIG. 7 shows a functional block provided for a determination process for display permission in this modification.

The CPU 100 includes a face extractor 111, a face parameter extractor 112, a registration controller 113, a matching determiner 114, and a display permitter 115. The memory 200 includes a face register 211.

The face extractor 111, the face parameter extractor 112, the registration controller 113, the matching determiner 114, and the display permitter 115 are implemented as software functions executed by the CPU 100. Moreover, a storage area, which is a part of the memory 200, is allocated to the face register 211.

Image data outputted from the in camera 23 is inputted to the CPU 100 through the video encoder 302. This image data is acquired at the face extractor 111 or the face parameter extractor 112.

The face extractor 111 acquires image data for one screen (one frame) at every frame or a few frames, and extracts the region (the face region) of a face image included in the image based on this image data. For example, the face extractor 111 detects skin tones in the image, and detects characteristic portions such as eyes, a nose, and a mouth based on shades or the like of the image for extracting the face region. The face extractor 111 then outputs information to determine the face region (in the following, referred to as "face region information"), such as position information of a face line, for example, to the face parameter extractor 112. It is noted that since the in camera 23 generally shoots only a user's face to be authenticated, the face extractor 111 is to extract a single face region in one screen.

The face parameter extractor 112 acquires image data for one screen at the same timing when the face extractor 111 acquires image data, and extracts a parameter to characterize a face image from image data corresponding to the face region based on face region information sent from the face extractor 111. For example, for the parameter, the shapes of parts such as eyes, a nose, a mouth, the ratio of a distance between the parts, skin colors, or the like are named.

As described above, the face parameter extractor 112 extracts the parameter of the face image for the face region extracted by the face extractor 111, and outputs the parameter to the matching determiner 114.

The matching determiner 114 checks the parameter of the sent face image against the parameter of the face image registered in the face register 211, and calculates a matching rate (a relevance factor) to the registered face image. The matching determiner 114 then outputs the calculated matching rate to the display permitter 115.

The registration of the parameter of the face image in the face register 211 is carried out by the registration controller 113. When the user makes an input manipulation for registration, the registration controller 113 instructs the face parameter extractor 112 to send the parameter to the face register 211. When receiving this instruction, the face parameter extractor 112 sends the parameter of the extracted face image to the face register 211 at the time when receiving this instruction. As described above, the parameter of the face image is registered in the face register 211.

The display permitter 115 determines whether to permit display by comparing the matching rate sent from the matching determiner 114 with a preset threshold.

Figure 8:
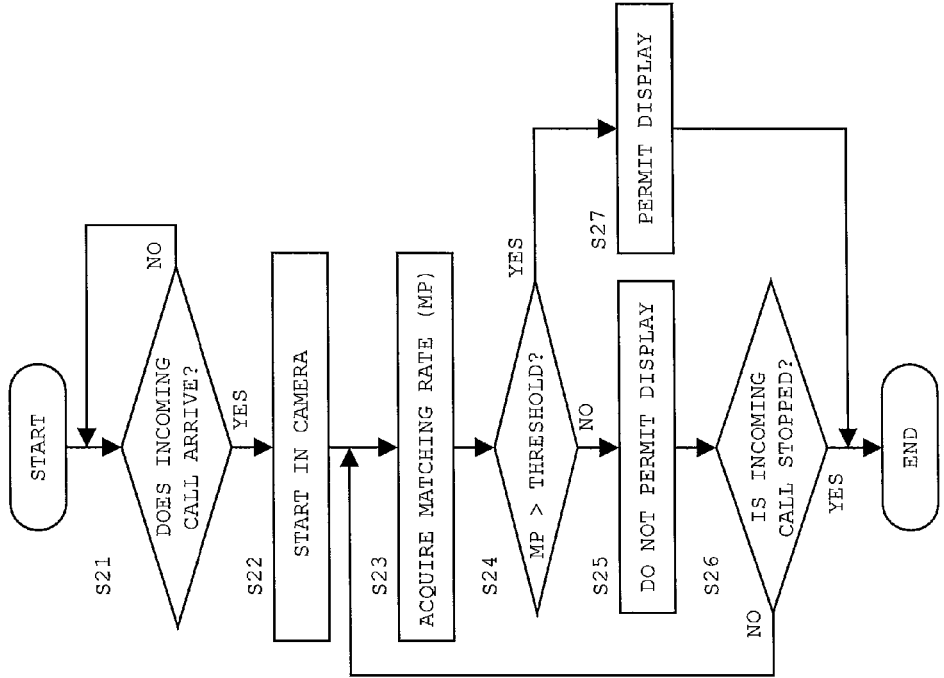
FIGS. 8(a) and 8(b) are flow charts illustrating a determination process for display permission in accordance with modification example 1 and modification example 2.
Figure 8:
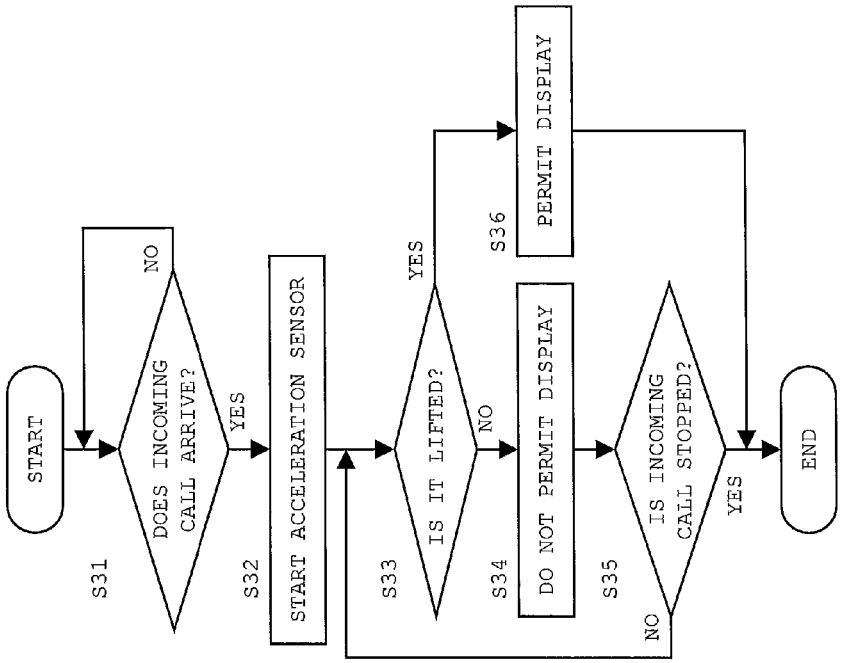

Next, the determination process for display permission in this modification will be described in detail. FIG. 8(a) is a flow chart illustrating the determination process for display permission in this modification.

When an incoming telephone call (incoming electronic mail) arrives (S21: YES), the display permitter 115 starts the in camera 23 (S22). When the user presents his/her face in front of the in camera 23, the in camera 23 shoots the user face, and a matching rate is outputted from the matching determiner 114 as described above.

When the display permitter 115 acquires the matching rate (S23), the display permitter 115 compares the acquired matching rate with a predetermined threshold (S24). In this comparison, if the matching rate does not exceed the threshold (S24: NO), the display permitter 115 does not provide display permission for the display controller 101 because the face of another person might be shot by the in camera 23 (S25).

On the other hand, if the matching rate exceeds the threshold (S24: YES), the display permitter 115 provides display permission for the display controller 101 because the user him/herself is shot by the in camera 23, that is, the user him/herself performs the action of authentication (S27).

As described above, after providing display permission for the display controller 101, the display permitter 115 ends the process. Moreover, the display permitter 115 also ends the process when the incoming call operation is ended with no provision of display permission (S26: YES), As described above, with the configuration of modification example 1, authentication is performed only by the user to present his/her face in front of the in camera 23, that is, by the user to see the display 21, so that it is possible that the user readily performs the action of authentication.

Modification Example 2

In the aforementioned embodiment and modification example 1, such a configuration is provided in which display permission is provided by performing authentication in accordance with preset authentication data. However, as in this modification, such a configuration may be possible in which authentication is not performed for obtaining display permission.

In this modification, in the configuration shown in FIG. 4, the pattern extractor 102, the matching determiner 103, and the pattern register 202, that is, the configuration related to authentication is eliminated. Acceleration data from the acceleration sensor 12 is then directly inputted to the display permitter 104.

Next, a determination process for display permission in this modification will be described in detail. FIG. 8(b) is a flow chart illustrating the determination process for display permission in this modification.

When an incoming telephone call (incoming electronic mail) arrives (S31: YES), the display permitter 104 starts the acceleration sensor 12 (S32). When the user lifts the mobile telephone, acceleration data corresponding thereto is inputted to the display permitter 104.

When the display permitter 104 determines that the mobile telephone is lifted from the inputted acceleration data (S33: YES), the display permitter 104 provides display permission for the display controller 101 (S36).

As described above, the display permitter 104 provides display permission for the display controller 101, and then ends the process. Moreover, the display permitter 104 also ends the process when the mobile telephone is not lifted (S33: NO), display permission is not provided (S34), and the incoming call operation is also ended (S35: YES).

As described above, with the configuration in the modification example 2, the action of authentication is unnecessary, so that it is possible to facilitate providing display permission by the action of the user. Thus, it is possible that the user more readily confirms an originator's name.

It is noted that the configuration is not limited to the configuration to determine the motion of lifting the mobile telephone as described above, and such a configuration may be possible in which other motions of the mobile telephone such as the motion of shaking the mobile telephone are determined to output display permission.

The acceleration sensor 12 and the display permitter 104 in this modification correspond to a "move detector" described in claim 6. In this modification, when the acceleration sensor 12 detects an upper vertical acceleration exceeding a threshold, it is determined that the mobile telephone is lifted (the mobile telephone is moved in a predetermined direction), and it is detected that a trigger action is performed for displaying information based on a name or title. Moreover, in the case where permission is determined by the motion of shaking the mobile telephone, it is determined that the mobile telephone is shaken (the mobile telephone is moved in predetermined directions) when the acceleration sensor 12 detects information about acceleration by the shaking motion, that is, the acceleration of reversing directions, and it is detected that a trigger action is performed for displaying information based on a name or title.

Modification Example 3

Figure 9:
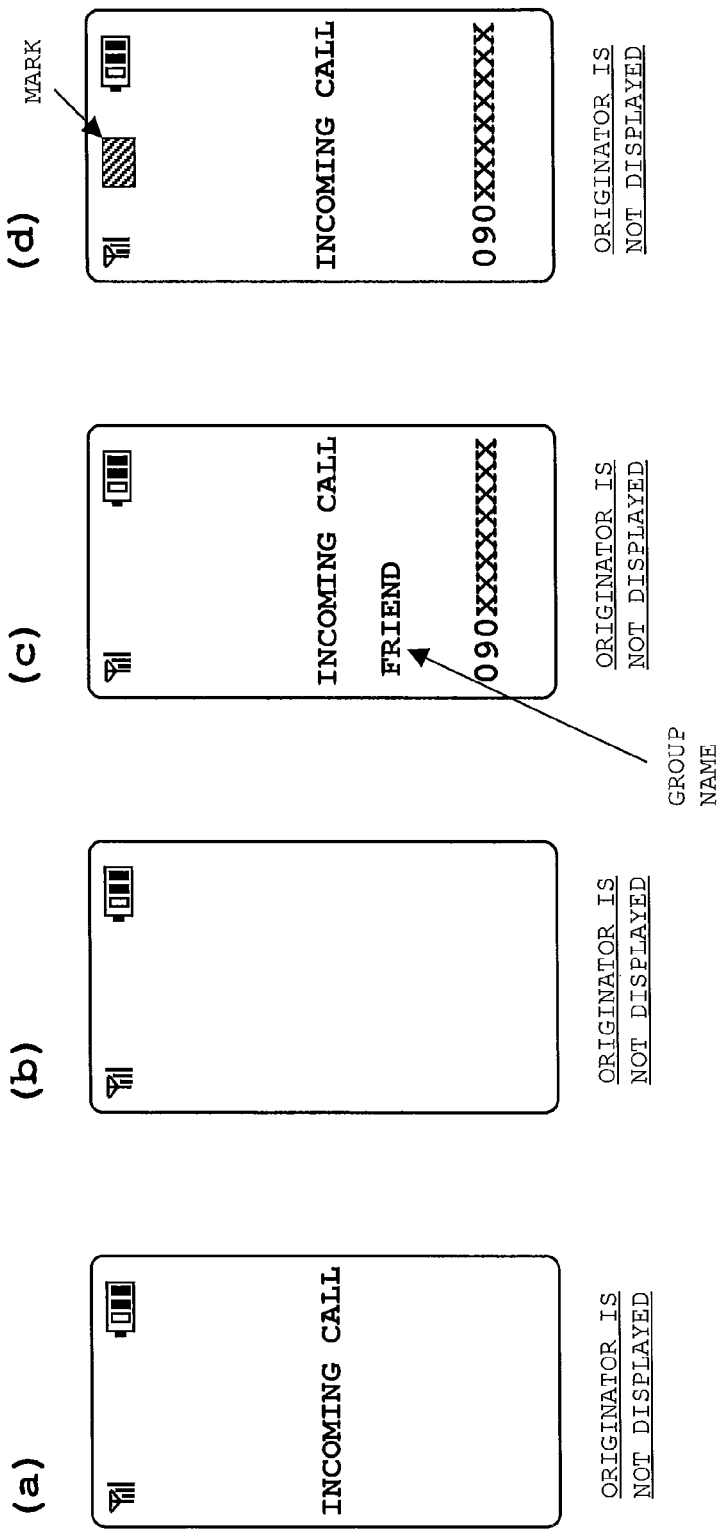
FIGS. 9(a) to 9(d) are diagrams illustrating a display screen in notifying of the arrival of an incoming call (before display permission) in accordance with modification example 3.

In the aforementioned embodiment, such a configuration is provided in which the display controller 101 causes the display 21 to display the arrival of an incoming call and a telephone number (a mail address) as shown in FIG. 6(a) in the process in Step S3 in FIG. 5(a). However, various ways of display are possible as shown in FIG. 9, not limited to such display.

For example, as shown in FIG. 9(a), the display controller 101 may cause the display 21 to display only the fact that an incoming call is arriving, without displaying a telephone number (a mail address). Moreover, as shown in FIG. 9(b), the display controller 101 may cause the display 21 to display no information about an incoming call.

On the other hand, as shown in FIG. 9(c), the display controller 101 may cause the display 21 to display a group name to which an originator belongs, not an originator's name. It may not matter that others know a group name because the personal information characteristics of a group name are lower than those of a name although the group name is information related to the originator.

With this configuration, it is possible that the user obtains the outline of information related to an originator without making an authentication manipulation or the like.

Furthermore, as shown in FIG. 9(d), the display controller 101 may cause the display 21 to display a specific mark to prompt the user to make input for authentication. This mark is not displayed in the case where an originator is a person who is not registered in a telephone book, whereas the mark is displayed only in the case where an originator is a person who is registered in the telephone book. With this configuration, it is possible that the user recognizes that an originator is a person who is registered in a telephone book table 201 even though the user does not remember the telephone number of the originator. Moreover, it is possible that the user recognizes that it is necessary to provide authentication for displaying an originator's name (it is necessary to provide display permission).

<Others>

Various modifications and alternations are possible other than the forms shown in the aforementioned embodiment and modifications. For example, as similar to the aforementioned embodiment, for the configuration to perform authentication based on a specific manipulation to the mobile telephone made by the user, such a configuration may be possible in which authentication is performed based on key input from the key input circuit 305. In this case, in the configuration in FIG. 5, key input data is inputted to the pattern extractor 102. Moreover, in the registration mode, a key input pattern such as a few digits of a personal authentication number is registered in the pattern register 202. The matching determiner 103 matches the key input pattern from the pattern extractor 102 against the registered key input pattern. The display permitter 104 then provides display permission based on the matching rate.

Furthermore, such a configuration may be possible in which authentication is performed based on input from the touch sensor 22. In this case, in the configuration in FIG. 5, data detected at the touch sensor 22 is inputted to the pattern extractor 102. In addition, in the registration mode, when the user draws a figure or character on the touch sensor 22, a drawing pattern corresponding thereto (in the following, referred to as an "authentication drawing pattern") is extracted by the pattern extractor 102, and registered in the pattern register 202. In notifying the arrival of an incoming call, the pattern extractor 102 extracts a drawing pattern based on the data detected at the touch sensor 22, and outputs the drawing pattern to the matching determiner 103. The matching determiner 103 matches the drawing pattern inputted from the pattern extractor 102 against the registered authentication drawing pattern. The display permitter 104 then provides display permission based on the matching rate.

Moreover, in modification example 1, such a configuration is provided in which authentication is performed using a face image. However, authentication may be performed using a part of a human body such as the image of a hand (the image of a hand shape), for example. Furthermore, as similar to modification example 1, for the configuration to perform authentication using a part of a human body, such a configuration may be adopted in which authentication is performed by eye identification (iris identification) or fingerprint identification. In this case, for a detector in the present invention, an authentication device for iris identification or an authentication device for fingerprint identification is provided.

Moreover, in the aforementioned embodiment, when display permission is provided by the display permitter 104, the display controller 101 causes the display 21 to display an originator's name (information based on a name or title). However, such a configuration may be possible in which when display permission is provided by the display permitter 104, such information is displayed as an originator's address and an originator's face image for originator information to be personal information together with an originator's name, not limited thereto. In this case, it is necessary that information such as an originator's address or a face image be registered in advance in the telephone book table 201.

Furthermore, in the aforementioned embodiment, the present invention is applied to a so-called sliding mobile telephone. However, the present invention may be applied to a so-called foldable mobile telephone, not limited thereto. Generally, in the foldable mobile telephone, a sub display is provided at a portion on the outer side in a folded state, in addition to a main display. Therefore, desirably, such a configuration may be provided in which in the case where the mobile telephone is opened, an originator's name (information based on a name or title) is displayed on the main display in response to authentication or the lifting motion, whereas in the case where the mobile telephone is closed, an originator's name is displayed on the sub display in response to authentication or the lifting motion. In addition, in the case where authentication is performed using a face image shot by a camera as modification example 1, desirably, an in camera is provided on the same surface as the surface on which the main display is provided and an out camera is provided on the same surface as the surface on which the sub display is provided.

Moreover, the mobile terminal device of the present invention is not limited to a mobile telephone, which may be a PDA (Personal Digital Assistant) or the like.

In addition to this, the embodiment of the present invention can be variously modified and altered appropriately within the scope of the technical ideas described in the claims.

REFERENCE SIGNS LIST

12 Acceleration sensor
21 Display
23 In camera
22 Touch sensor
101 Display controller
102 Pattern extractor
103, 114 Matching determiner
104, 115 Display permitter
111 Face extractor
112 Face parameter extractor
113 Registration controller
202 Pattern register
211 Face register
305 Key input circuit

The invention claimed is:

1. A mobile terminal device comprising:
a display section;
a display controller which controls the display section;

a storage section which stores at least second information based on a name or title indicating an originator in association with first information comprising a telephone number or mail address; and a detector which detects whether a predetermined trigger action is made to the mobile terminal device, wherein, if an incoming call or mail arrives at the mobile terminal device, the display controller causes the display section to display the first information that comprises a telephone number or mail address corresponding to the incoming call or mail, but not display the second information associated with the corresponding first information, and, if the detector subsequently detects the trigger action, causes the display section to display the second information that is based on a name or title indicating the originator of the incoming call or mail, the detector detects whether the trigger action is made based on matching between authentication information that prescribes the predetermined trigger action and information taken in the mobile terminal device when the arrival is notified, the detector comprises a manipulation detector which detects a predetermined manipulation to the mobile terminal device; the detector sets the authentication information based on a result detected at the manipulation detector, and detects whether the trigger action is made based on matching between a result detected at the manipulation detector when the arrival is notified and the authentication information, the manipulation detector comprises an acceleration sensor; and the detector sets the authentication information based on acceleration information when the mobile terminal device is moved in a predetermined pattern, and detects whether the trigger action is made based on matching between information detected at the acceleration sensor when the arrival is notified and the authentication information.

2. The mobile terminal device according to claim 1, wherein: the detector comprises an imager; and the detector sets the authentication information based on an image taken in advance at the imager, and detects whether the trigger action is made based on matching between image information taken at the imager when the arrival is notified and the authentication information.

3. The mobile terminal device according to claim 1, wherein:
the detector comprises a move detector which detects whether the mobile terminal device is moved; and
the detector detects that the trigger action is made when the move detector detects that the mobile terminal device is moved in a predetermined direction when the arrival is notified.

4. The mobile terminal device according to claim 1, wherein:
the storage section stores, for the originator information, information other than the telephone number or mail address and having a personal information characteristic lower than a personal information characteristic of the information based on a name or title; and
the display controller causes the display section to display the information having a low personal information characteristic in a predetermined timing from a start of the notification of the arrival to a detection of the trigger action.

5. The mobile terminal device according to claim 1, wherein the display controller causes the display section to display an indication to prompt making input of the trigger action when the arrival is notified.

6. A method of identifying the originator of an incoming call, the method comprising, on a mobile terminal device, using at least one hardware processing unit:
storing at least first information comprising a telephone number or mail address in association with second information based on a name or title indicating an originator; and,
if an incoming call or mail arrives at the mobile terminal device,
displaying the first information that comprises a telephone number or mail address corresponding to the incoming call or mail, but not displaying the second information associated with the corresponding first information,
if a predetermined trigger action, which is a manipulation of the mobile terminal device and comprises a predetermined pattern, is subsequently detected, displaying the second information that is based on a name or title indicating the originator of the incoming call or mail, and
detecting the predetermined trigger action by matching a detected action, which is received from an acceleration sensor, with authentication information that prescribes the predetermined trigger action when the arrival is notified.

7. The method of claim 6, wherein the predetermined trigger action comprises acquisition of a face image.

8. The method of claim 6, wherein the predetermined trigger action comprises a movement of the mobile terminal device in a predetermined direction.

9. The method of claim 6, further comprising displaying third information having a personal information characteristic lower than a personal information characteristic of the second information after a predetermined time from a start of a notification of the arrival of the incoming call or mail to a detection of the predetermined trigger action.

10. The method of claim 6, further comprising displaying an indication to prompt a user of the mobile terminal device to perform the trigger action when the arrival of the incoming call or mail is notified.

* * * * *